2,914,418
MANUFACTURE OF CARBON BLACK FROM LIQUID HYDROCARBONS

Du Bois Eastman, Whittier, Calif., assignor to Texaco Inc., a corporation of Delaware No Drawing. Application March 2, 1956
Serial No. 568,963

4 Claims. (Cl. 106—307)

This invention relates to a process for the production of carbon black, carbon monoxide, and hydrogen by reaction of a liquid hydrocarbon with an oxygen-containing gas and to product formed thereby. In one of its more specific aspects, this invention relates to a method for producing free carbon, carbon monoxide and hydrogen by partial oxidation of a liquid hydrocarbon with steam and free oxygen, and to the carbon so produced.

This application is a continuation-in-part of my copending application Serial No. 487,451, filed February 10, 1955, and now abandoned.

In accordance with this invention a liquid hydrocarbon is reacted with free oxygen and steam in relative proportions such that the hydrocarbon is converted to substantially maximum amounts of carbon monoxide and hydrogen while at the same time a substantial amount of the carbon contained in the oil is released as free carbon. The relative proportions of the reactants are so controlled that carbon monoxide and hydrogen are the principal gaseous products. The oil is directly admixed with and reacted with the steam and oxygen. The proportions are such that the reaction temperature is autogenously maintained with all of the heat, other than preheat, supplied by the reaction. In contrast, in conventional furnace-black processes, the oil is subjected to cracking by injection, with or without added air or oxygen, into a reaction zone wherein at least a portion of the heat required for the process is supplied by supplemental combustion.

The process of this invention is applicable to the production of carbon from a normally liquid hydrocarbon. The carbon so produced has unusual properties, as compared with carbon from conventional carbon black processes, as will be evident from the following detailed description. The process is especially useful for the production of carbon black, hydrogen and carbon monoxide from heavy oil, e.g. a heavy crude or crude residuum. An important advantage of the present process is the simultaneous production of carbon monoxide and hydrogen, together with carbon. The carbon, as well as the carbon monoxide and hydrogen, is a useful product.

The carbon produced by the process of this invention differs from the carbon black produced by other furnace processes.

The unsettled bulk densities of samples of carbon produced by the process described herein fall within the range of 0.3 to 1 pound per cubic foot. Typically, the bulk density is about 0.5 pound per cubic foot. In contrast, carbon produced by the usual furnace black plants has a bulk density on the order of 10 to 12 pounds per cubic foot. Carbon from channel black plants has a bulk density on the order of 3 pounds per cubic foot.

Samples of carbon product, as described herein, when mixed with water, settle until a concentration of about 0.5 to 1 percent carbon by weight is reached, after which no further concentration by gravity occurs. This represents a concentration of about 0.3 to 0.6 pound of carbon per cubic foot. In contrast, carbon from a channel black process when dispersed in water reaches a concentration on settling on the order of 6 to 8 percent carbon, while carbon from furnace black plants reaches a concentration on the order of 10 percent by weight.

The carbon produced by the process described herein exhibits considerably higher oil absorption than carbon blacks of comparable size and structure produced by the furnace process. Oil absorption of representative samples by the stiff paste oil absorption method is 35 to 40 gallons per hundred pounds as compared with about 16 for a fine furnace black of similar structure. ("Statex 125" furnace black marketed by Columbian Carbon Company, New York, New York, was used as a comparison standard.) The stiff paste test is made by mixing linseed oil with a one gram sample of carbon until a coherent ball is produced. Results are converted from cc./g. to gallons per hundred pounds. Iodine absorption values for the same representative samples gave values of 3 to 3½ times the iodine adsorption value of the comparison furnace black.

Volatile matter of the carbon black from this process runs on the order of 4 to 6 percent as compared with 1.4 for the comparison black. Channel black carbon generally contains on the order of 5 percent volatile matter while furnace carbons generally contain less than about 1½ percent volatile matter.

Furnace blacks generally are alkaline with a pH of 7 to 9, or even as high as 10. The high pH of furnace black is a disadvantage in some applications. Channel black generally has a pH in the range of 4 to 5. A representative black produced by the process of this invention (details of which appear below in a specific example) had a pH of 4.

Furnace processes usually produce from about 2 pounds of reinforcing black (RF) to about 4 pounds of high modulus black (HMF) per gallon of liquid hydrocarbon. The yield of black in this process is limited to from about .1 to 1 pound per gallon.

The ash content of the carbon produced by the present process may run to the order of 1 to 3 percent even when distillate (mineral-free) water is used for cooling. Although the ash in furnace carbon may run as high as 1.5 percent, the high ash content is generally attributed to salts in the water used for cooling. Ash in channel black may run as low as 0.05 percent.

Under the electron microscope, the carbon black produced by the present process appears as small, generally spherical particles joined together in highly branched chains. In a representative sample, the spheres had an estimated mean particle diameter of the order of 40 millimicrons. The individual particles of carbon, or spheres, have very irregular surfaces and appear pitted, and in some cases, hollow. The unusually high oil absorption and iodine adsorption values indicate that the surface area of the black is exceptionally high, which tends to confirm the observations made by means of the electron microscope as to the irregular surface characteristics of the individual particles.

The jetness of the carbon is considerably higher than that for furnace black of comparable size. Apparently this is due in part at least also to the pitted or hollow characteristic of the individual particles. A sample having a mean particle diameter of 40 millimicrons had a higher jetness, i.e. more "blackness" or greater light absorption, than the comparison furnace black (Statex 125) of comparable structure having an estimated mean particle diameter of 20 to 25 millimicrons. Generally, the smaller the particle diameter of a carbon black, the greater the jetness.

The carbon produced in the present process has an unusually high affinity for water, i.e. it is unusually hydrophilic in character. In a comparison test, a sample of black produced under conditions described hereafter contained 80 percent adsorbed moisture at the end of 14 days, as compared with 16 percent for a furnace black of comparable structure, and 8 to 20 percent for other furnace blacks.

The general structure of the carbon is similar to the characteristic structure of acetylene black produced by thermal decomposition of acetylene by contact with heated refractory surface. Acetylene black, however, does not exhibit the high oil absorption, iodine adsorption or moisture adsorption exhibited by the carbon produced by this process.

The product of the present process is useful in inks and paints and is particularly useful for specialties in with great jetness is required and luster is not important. The product is also useful in applications where a high modulus reinforcing black or a conductive black is indicated. In such cases, it is often desirable to blend the black from the present process with furnace black. The anomalously high absorptive and adsorptive properties of this black indicate its application in purification of oils and wines, in dry cell batteries, in explosives, and as trace adsorbents in electrical insulators and radio tubes.

Petroleum commonly contains small quantities of heavy metals. The most common heavy metals contained in petroleum are vanadium, nickel, iron, chromium and molybdenum. These heavy metals presumably occur in petroleum as compounds. The exact chemical compositions of the heavy metal compounds are somewhat in doubt. It is generally agreed that the metals are present, at least in part, in the form of oil-soluble metallo-organic compounds. Crude oils containing heavy metal constituents, and some heavy distillates from such crudes, have been found unsatisfactory for many purposes because of the nature of the ash from these fuels.

The extent to which heavy metals or their compounds are present in petroleum may vary from about 1 to about 1000 parts per million by weight based upon the weight of the metal. In commercial operations, oils containing heavy metals are considered unsuitable as feed stock to carbon black processes. It has been found, however, that by the process disclosed herein, a carbon product having unique properties may be produced and the presence of heavy metals is not detrimental to the product. While it is difficult to assess the effect of heavy metals on the properties of the product carbon, it is believed that the presence of heavy metals in concentrations above 10 parts per million and preferably above 100 parts per million are at least partially responsible for the unique properties of the carbon. The foregoing theory is advanced as a possible explanation of the fact that the carbon produced in accordance with this invention differs from furnace black carbon as produced in commerce. It is to be understood, however, that this theory is given by way of explanation only and is not to be construed in any way as limiting the present invention.

Of the heavy metal constituents which normally occur in petroleum fuels, vanadium, nickel and iron occur in the greatest concentrations. Usually petroleum oils containing even minor amounts of vanadium are troublesome when used as fuel. The ash from these oils is corrosive or erosive to both refractories and alloy metals. To a lesser extent, fuel oils containing nickel and molybdenum are also troublesome from the standpoint of corrosion and erosion. Of the heavy metal contaminants, vanadium and nickel apparently are the most detrimental to refractories, particularly to aluminum oxide refractories. It has been found, however, that under conditions of partial oxidation as employed herein wherein a substantial part of the carbon contained in the fuel, i.e. at least 0.5 percent, is liberated as free carbon in the presence of a non-oxidizing or highly reducing atmosphere, the heavy metals have little or no deleterious effect on high temperature refractories.

In accordance with this invention, a hydrocarbon oil, for example a residual fuel oil, is reacted with steam and oxygen in a compact reaction zone at a temperature in the range of 2000 to 3200° F., preferably above 2250° F. and advantageously, in the range of 2500 to 2900° F. The reaction zone is free from packing and catalyst and preferably has near-minimum internal surface. A satisfactory reactor, as a specific example, is one in the form of a cylinder the length of which is about 2½ times its diameter. Reactors having a length-to-diameter ratio within the range of from about 1 to 4 are generally most suitable.

The reaction temperature, suitably about 2600° F., is autogenously maintained Preheating of the reactants is generally desirable. The amount of uncombined oxygen supplied to the reaction zone is limited so that near-maximum yields of carbon monoxide and hydrogen are obtained. The product consists essentially of carbon monoxide and hydrogen and contains relatively small amounts of unconverted hydrocarbon and carbon dioxide.

The reaction may be conducted at atmospheric pressure or at an elevated pressure which may be as high as, for example, 1000 p.s.i.g. A pressure within the range of 100 to 600 p.s.i.g. is generally preferred.

Air, oxygen-enriched air, or substantially pure oxygen may be employed in the production of carbon monoxide and hydrogen from the fossil carbonaceous fuel stocks used. Oxygen may be obtained from the rectification of air. Commercial oxygen plants are available capable of delivering large amounts of high purity oxygen. Commercial oxygen, so produced, usually contains in excess of 95 mol percent oxygen.

The relative proportions of fuel, oxygen and steam required vary with various fuels and may be readily determined by trial for any particular fuel. The proportions of oxygen, steam and hydrocarbon are balanced to autogenously maintain the desired operating temperature and extent of carbon conversion. It is evident that the reaction between the hydrocarbon and oxygen is highly exothermic, whereas reactions with steam are endothermic. Steam serves the dual function of limiting the maximum temperature in the reaction zone and, at the same time, the steam supplies oxygen for the reaction and produces hydrogen. To conserve free oxygen, the steam preferably is preheated to a temperature of at least 600° F. Advantageously, the steam is heated to a temperature as high as practical, for example, to a temperature in the range of 600 to 1200° F. Higher preheat temperatures are desirable but generally are not practical. The quantity of free oxygen supplied to the reaction zone is limited so that the conversion of carbon to carbon oxides is within the range of 90 to 99.5 percent of the carbon content of the oil fed to the reaction zone. The extent of conversion of the carbon may be varied within this range depending upon the amounts of heavy metals contained in the fuel. The quantity of unconverted carbon should be at least 50 times and preferably at least 100 times the combined weights of the nickel and vanadium contained in the fuels on the basis of the weight of the metal content of the metal-containing constituents present in the fuel. The unconverted carbon from the hydrocarbon is liberated as free carbon.

The total oxygen, that is oxygen supplied by dissociation of steam, together with free oxygen, generally is somewhat in excess of the theoretical amount stoichiometrically required to convert all of the carbon in the hydrocarbon oil to carbon monoxide. It has been found that even though the total oxygen entering into the reaction is in excess of the theoretical amount stoichiometrically required to convert all of the carbon in the fuel to carbon monoxide, free carbon is formed. This may be explained by the fact that some of the oxygen combines with hydrogen from the fuel to form water vapor. It has been found that the gross heating value of the oil is a convenient index of the free oxygen requirements. From about 1.8 to about 1.9 mols of free oxygen are required for each million B.t.u.'s gross heating value of the oil fed to the reactor. The free oxygen requirements are generally within the range of from about 0.6 to about 1.3 pounds per pound of oil while the steam requirements range from about 0.2 to about 1.5 pounds per pound of oil. Examples of typical feed proportions are 0.5 to 0.6 pound steam and 1 to .95 pound oxygen, respectively, per pound of oil.

The desirability of preheating the steam has previously been mentioned. It is generally desirable to preheat the other reactants to a temperature as high as practical. Air, for example, is preferably preheated to a temperature of at least 600° F. Due to the reactivity of pure oxygen, it is usually undesirable to preheat the oxygen at all, or to preheat the oxygen to a temperature not in excess of 600° F. Satisfactory operation may be obtained with no preheat of the oxygen feed stream. The hydrocarbon oil may be preheated generally to a temperature above 600° F.; the hydrocarbon preheat is limited by the cracking tendency of the particular oil. Generally, cracking limits the practical preheat temperature to a temperature below about 800° F. Satisfactory operation is obtained by separately preheating the oil to a temperature approaching its vaporization temperature at the pressure existing in the feed line, admixing the preheated oil with steam to form a dispersion of the oil in steam, and further preheating the dispersion to a temperature on the order of 700° F.

The amount of carbon dioxide in the product gas is a convenient indicator in the correct relative proportions of fuel oil, oxygen and steam. In general, the carbon dioxide content of the product gas stream should be within the range of from about 2 to about 6 percent and preferably on the order of 3½ to 5½ percent.

Ash from the fuel, particularly the heavy metal constituents, is substantially completely retained in the carbon product. As a result of sequestering the ash with the carbon, the refractory lining of the generator is protected from attack by the heavy metals. The concentration of heavy metals in the carbon may vary from about 0.5 to about 10 percent by weight.

The hot gases from the generator, containing entrained carbon are cooled to a temperature below the reaction temperature, after which the carbon is separated from the gas stream. Separation may be effected by conventional means, e.g. Cottrell precipitators, cyclone separators and bag filters. In a preferred embodiment, the hot gases from the reaction zone, containing entrained carbon, are contacted directly with water. In a specific example, this is accomplished by discharging the gases through a submerged outlet conduit into a body of water, and the gas stream is then further scrubbed for complete carbon removal by countercurrent contact of the gas stream with a stream of water. The gas stream is a mixture consisting predominantly of carbon monoxide and hydrogen, which is useful as feed gas for other commercial operations.

The following specific examples are illustrative of the present invention. In each of the examples the generator was provided with a lining of 2½ inches of high purity Alundum (aluminum oxide) surrounded by insulating fire brick.

In each of the following examples the fuel oil was a San Ardo crude oil of the following composition and physical properties.

Gravity _____ 12.8° API.
Viscosity _____ 650 S.F. at 122° F.
Flash _____ 235° F.
Pour point _____ 50° F.
Conradson carbon _____ 9.6
Gross heating value _____ 18,450 B.t.u./lb.

Ultimate analysis:
   Carbon _____ 85.5 wt. percent.
   Hydrogen _____ 11.0 wt. percent.
   Nitrogen _____ 1.0 wt. percent.
   Sulfur _____ 1.9 wt. percent.
   Oxygen _____ 0.6 wt. percent.
Ash:
   Vanadium _____ 68 p.p.m.
   Nickel _____ 56 p.p.m.
   Iron _____ 57 p.p.m.

The oil was atomized with steam and mixed with oxygen of 99.9 percent purity in a flow-type gas generator of the type disclosed in U.S. Patent 2,582,938.

|  | Example 1 | Example 2 |
|---|---|---|
| Feed Rates: | | |
|   Oxygen, s.c.f./hr | 5,186 | 12,187 |
|   Oil, lbs./hr | 401.5 | 954 |
|   Steam, lbs./hr | 224.1 | 258 |
|   Mols $O_2$/MM B.t.u. of oil | 1.847 | 1.824 |
| Operating Conditions: | | |
|   Gen. Temperature (°F.) | 2,600 | 2,850 |
|   Gen. Pressure (p.s.i.g.) | 373 | 341 |
|   Preheat Temperature (°F.)— | | |
|     Oil-Steam | 710 | 740 |
|     Oxygen | 67 | 70 |
| Carbon Production— | | |
|   Pounds per hour | 1.50 | 15.47 |
|   Unconverted carbon (Percent) | 0.44 | 1.89 |
| Dry Gas Production, s.c.f./hr | 20,195 | 47,915 |
| Product Gas Analysis—Dry Basis (Mol percent): | | |
|   Hydrogen | 47.0 | 46.51 |
|   Carbon Monoxide | 47.0 | 49.06 |
|   Carbon Dioxide | 5.5 | 3.71 |
|   Nitrogen | 0.3 | 0.22 |
|   Methane | 0.1 | 0.04 |
|   Hydrogen Sulfide | 0.1 | 0.44 |
|   Carbonyl Sulfide | | 0.02 |

After 186 hours of operation under operating conditions of high carbon conversion, representative data for which are shown in Example 1, the Alundum lining of the generator was examined and was found to be so badly deteriorated as to preclude further operation of the generator. The lining was replaced and after about 673 hours of operation under conditions of moderate carbon conversion, some of the data for which are shown in Example 2, the lining was examined and was found to be in excellent condition. Operations continued with the same generator under similar conditions of moderate carbon conversion until a total operating time of about 3091 hours had been accumulated. During this period a number of heavy fuel oils were fed to the generator. Some of the fuel oils contained larger amounts of vanadium and nickel than the amounts contained in the San Ardo crude. At the end of this period, inspection of the lining of the generator showed that it was in excellent condition.

No evaluation was made of the carbon produced in the above examples. The carbon from operations of Example 1 was not tested because operating conditions could not be maintained over a sufficiently extended period of time to ensure consistent operations.

*Examples 3 and 4*

Bunker fuel oil is charged to a four cubic foot generator as in Examples 1 and 2. The oil has the following composition and physical properties.

Gravity _____ 9° API.
Viscosity _____ 150 S.F. at 122° F.
Flash point _____ 285° F.
Gross heating value _____ 18,200 B.t.u./lb.
Ultimate analysis (wt. percent):
   Carbon _____ 87
   Hydrogen _____ 10
   Nitrogen _____ 0.9
   Sulfur _____ 1.3
   Oxygen _____ 0.8

Ash:
- Vanadium (wt. percent) —— 130 p.p.m.
- Nickel —— 80 p.p.m.
- Iron —— 73 p.p.m.
- Silica —— 240 p.p.m.
- Sodium —— 69 p.p.m.

The oil is atomized with steam and mixed with oxygen of over 99 percent purity. Operating conditions and product analyses are as follows:

|  | Example 3 | Example 4 |
|---|---|---|
| Feed Rates: |  |  |
| Oxygen, s.c.f./hr | 5,258 | 5,405 |
| Oil, lbs./hr | 441.9 | 442.7 |
| Steam, lbs./hr | 260.6 | 258.2 |
| Operating Conditions: |  |  |
| Gen. Temperature (°F.) | 2,540 | 2,577 |
| Gen. Pressure (p.s.i.g.) | 345 | 345 |
| Preheat Temperature (°F.)— |  |  |
| Oil-Steam | 722 | 716 |
| Oxygen | 62 | 61 |
| Carbon Production— |  |  |
| Pounds per hour | 15.79 | 9.69 |
| Unconverted carbon (percent) | 4.10 | 2.99 |
| Dry Gas Production, s.c.f./hr | 22,182 | 22,500 |
| Product Gas Analysis—Dry Basis (Mol percent): |  |  |
| Hydrogen | 46.9 | 46.7 |
| Carbon Monoxide | 47.0 | 47.3 |
| Carbon Dioxide | 5.2 | 5.3 |
| Nitrogen | 0.3 | 0.3 |
| Methane | 0.4 | 0.2 |
| Hydrogen Sulfide | 0.15 | 0.2 |
| Carbonyl Sulfide | 0.01 | 0.02 |

Properties of the carbon produced in Examples 3 and 4 are given in the following table:

|  | Example 3, Carbon | Example 4, Carbon | Statex 125, ISAF Carbon |
|---|---|---|---|
| Estimated Color (ABC Standard) | 162 | 146 | 140 |
| Oil Absorption (gal./100 lbs.) | 41 | 38 | 16 |
| Percent Volatile Matter | 6.0 | 4.8 | 1.4 |
| Iodine Adsorption | 436 | 424 | 115 |
| pH | 4.0 |  | 7.5 |
| Acetone Extractable (percent) | 0.43 |  | 0.07 |
| Ash (percent by wt.) | 1.83 |  | 0.20 |
| Moisture Absorption (14 days) Percent of wt. of Black | 80 |  | 16 |

Obviously, many modifications and variations of the invention as hereinbefore set forth may be made without departing from the spirit and scope thereof, and therefore only such limitations should be imposed as are indicated in the appended claims.

I claim:

1. As an article of manufacture, amorphous carbon black prepared from a petroleum oil containing naturally-occurring heavy metal compounds, said carbon black having an unsettled bulk density within the range of 0.3 to 1 pound per cubic foot and containing from about 0.5 to about 5 weight percent heavy metals of petroleum origin comprising vanadium.

2. A composition of matter comprising a carbon black prepared from a petroleum oil containing naturally-occurring heavy metal compounds, said carbon black containing 0.5 to 10 percent by weight of heavy metals of petroleum origin comprising vanadium, iron, and nickel wherein vanadium is present in largest amount.

3. As an article of manufacture, amorphous carbon black of low bulk density prepared from a petroleum oil containing naturally-occurring heavy metal compounds characterized by its ability to settle in water solely under the influence of gravity to a maximum concentration of about 0.5 to 1 percent carbon by weight and containing from about 0.5 to about 5 weight percent heavy metals of petroleum origin comprising vanadium.

4. As an article of manufacture, a hydrophilic carbon black prepared from a petroleum oil containing naturally-occurring heavy metal compounds, said carbon black containing compounds of said heavy metals of petroleum origin comprising vanadium and having a pH of about 4; a volatile content on the order of 5 to 6 percent; a mean particle diameter of the order of 40 millimicrons; and an irregular pitted surface and branched chain structure as determined by the electron microscope.

References Cited in the file of this patent

UNITED STATES PATENTS

| | | |
|---|---|---|
| 148,778 | Tait | Mar. 17, 1874 |
| 1,438,032 | Frost | Dec. 5, 1922 |
| 1,765,991 | Miller | June 24, 1930 |
| 1,999,573 | Odell | Apr. 30, 1935 |
| 2,350,846 | Vogel | June 6, 1944 |
| 2,350,847 | Vogel | June 6, 1944 |
| 2,356,471 | Rehner | Aug. 22, 1944 |
| 2,632,713 | Krejci | Mar. 24, 1953 |
| 2,684,896 | Coghlan | July 27, 1954 |
| 2,707,672 | Switzer | May 3, 1955 |
| 2,793,938 | Frank | May 28, 1957 |

FOREIGN PATENTS

| | | |
|---|---|---|
| 554,155 | Great Britain | June 22, 1943 |